July 21, 1936.  J. C. McCUNE  2,048,349
HYDRAULIC BRAKE SYSTEM
Filed Jan. 25, 1933  3 Sheets-Sheet 3
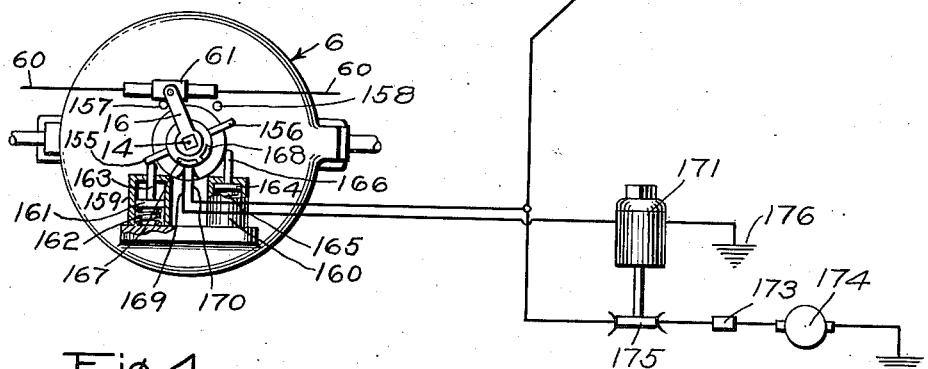
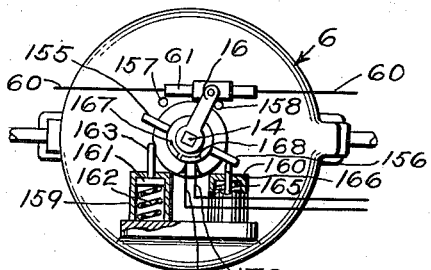
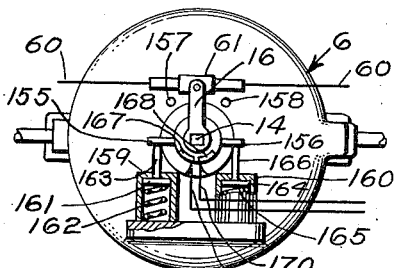
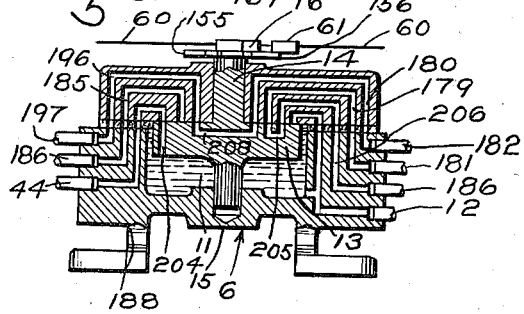
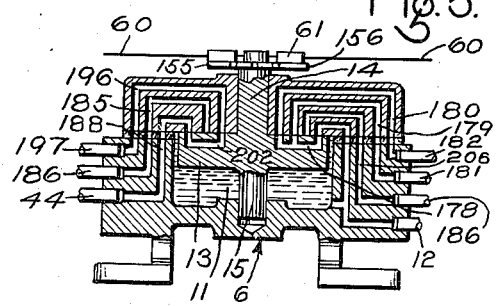
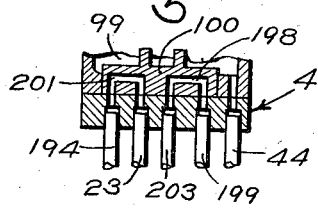
INVENTOR
JOSEPH C. McCUNE
BY *Wm. M. Cady*
ATTORNEY Patented July 21, 1936

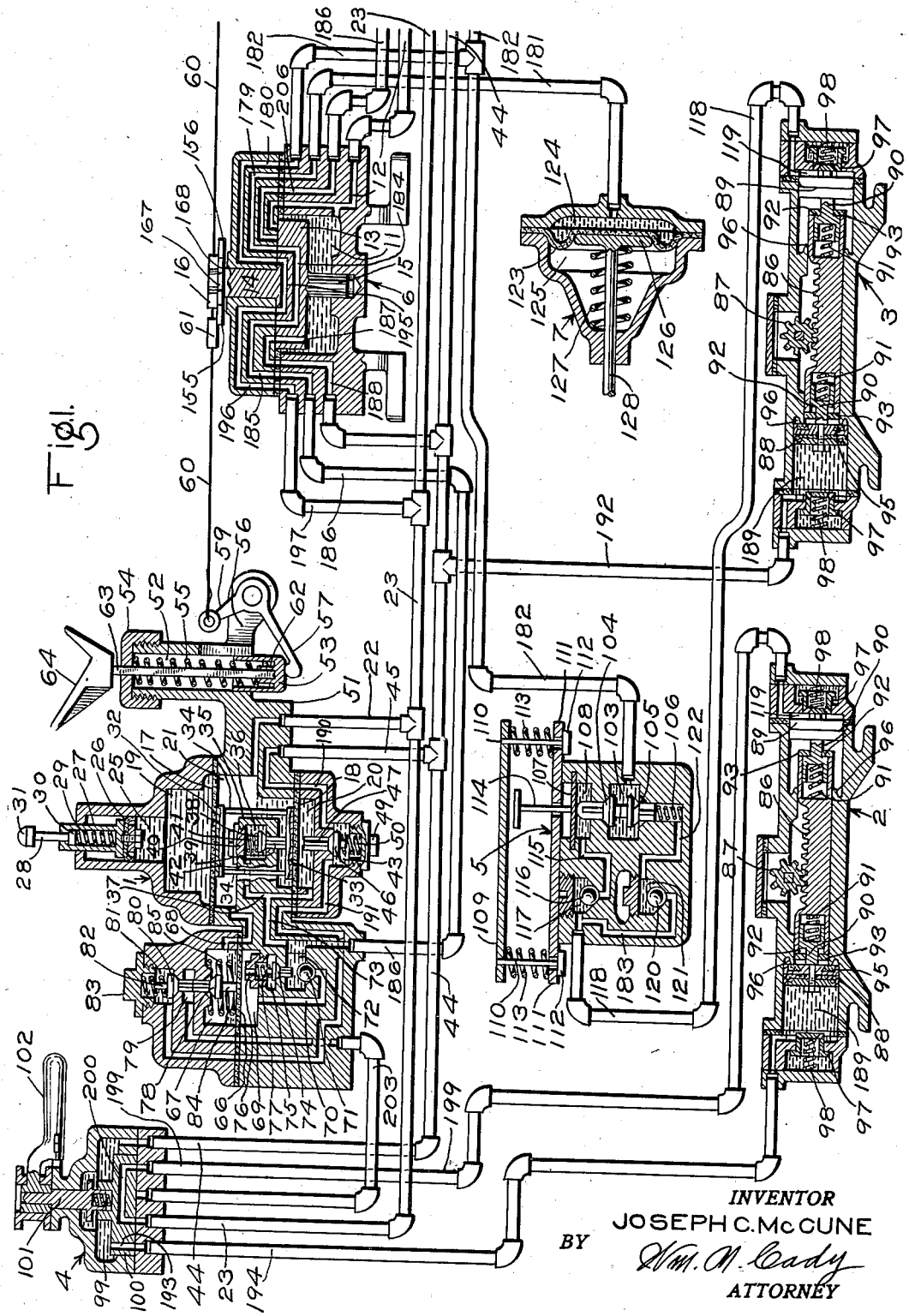

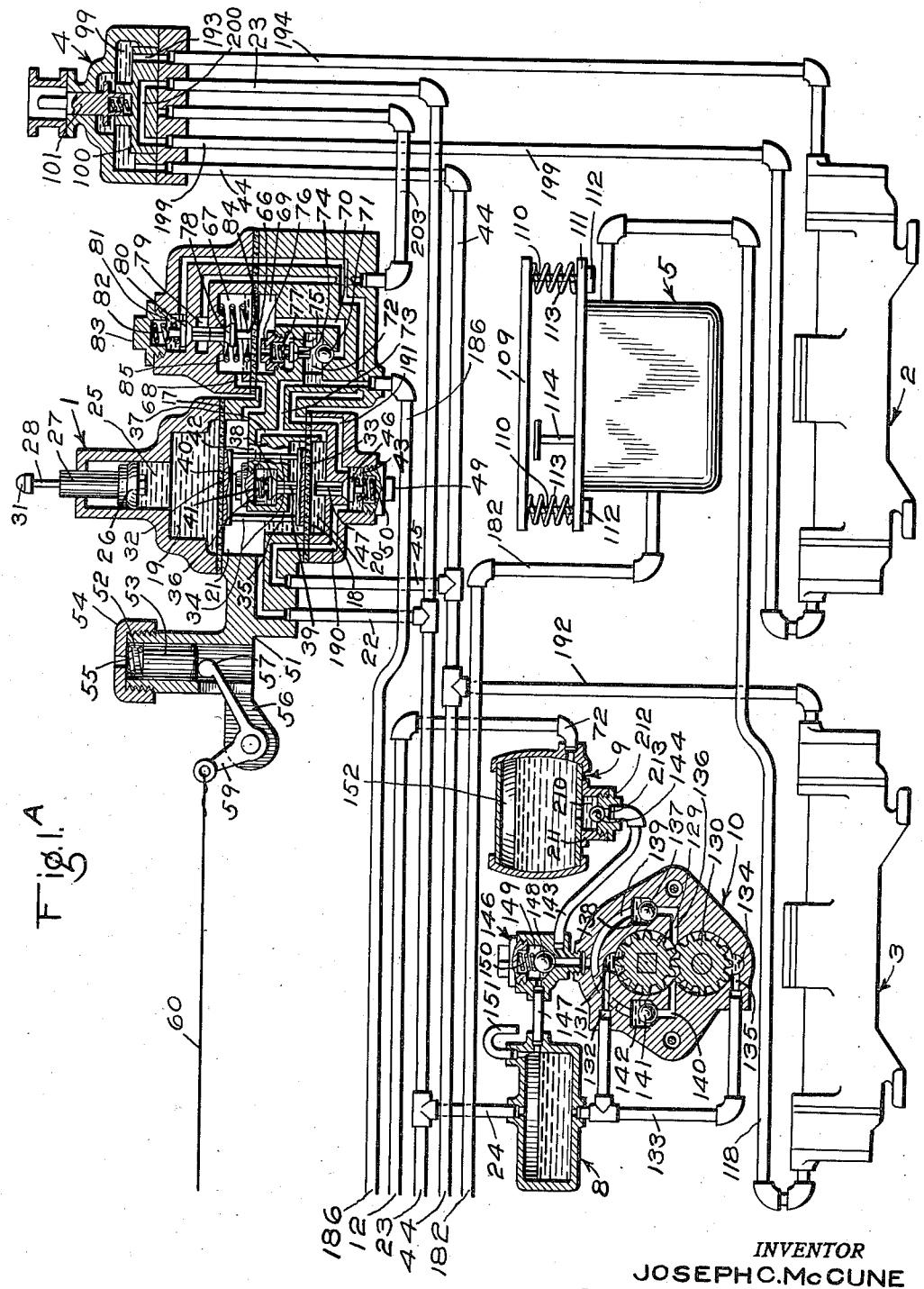

2,048,349

UNITED STATES PATENT OFFICE 2,048,349

HYDRAULIC BRAKE SYSTEM

Joseph C. McCune, Edgewood, Pa., assignor to The Westinghouse Air Brake Company, Wilmerding, Pa., a corporation of Pennsylvania Application January 25, 1933, Serial No. 653,383

26 Claims. (Cl. 303—6.1)

This invention relates to fluid pressure brakes and more particularly to a hydraulic brake system adapted for use on traction cars.

The principal object of the invention is to provide an improved hydraulic brake equipment having a manually controlled brake valve device for applying and releasing the brakes on a car, and having means conditioned by sustained manual pressure of the operator for permitting the brakes to be controlled by said brake valve device, said means being automatically operated upon the relief of manual pressure to effect an emergency application of the brakes.

Other objects and advantages will appear in the following more detailed description of the invention.

In the accompanying drawings; Figs. 1 and 1A, when associated form a diagrammatic view, mainly in section, of a double end hydraulic brake equipment embodying my invention and showing the emergency valve device in one of the normal operating positions; Fig. 2 is a plan view, partly in section, of the emergency valve device shown in Fig. 1 and showing means associated with the emergency valve device for controlling the motive power of the car; Fig. 3 is a diagrammatic sectional view of the emergency valve device with the parts shown in another normal operating position; Fig. 4 is a plan view, partly in section, of the emergency valve device and with the motive power control parts shown in a position corresponding to the position of the parts of the device as shown in Fig. 3; Fig. 5 is a diagrammatic, sectional view, of the emergency valve device with the parts shown in emergency position; Fig. 6 is a plan view, partly in section, of the emergency valve device showing the motive power control parts in emergency position; and Fig. 7 is a diagrammatic sectional view of a portion of the hand operated control valve device showing the communications established in the door opening position.

As shown in Figs. 1–1A of the drawings, the brake equipment may comprise an emergency or selector valve device 6 located intermediate the ends of the car, and a foot controlled brake valve device 1 at each end of the car for controlling the car brakes and for conditioning the emergency valve device 6 according to which end of the car is the operating or controlling end. The brake equipment further comprises at each end of the car, an entrance door engine 2, an exit door engine 3, a hand operated door valve device 4 controlled by the operator for controlling the entrance door engine 2 at the operating end of the car, and a treadle operated door valve device 5 controlled by a passenger for controlling the operation of the exit door engine 3 at the corresponding end of the car. The equipment still further comprises a brake cylinder 7, a sump reservoir 8 containing liquid under atmospheric pressure, a pressure reservoir 9 containing liquid under operating pressure and a reversible pump 10 for pumping liquid from the sump reservoir 8 into the reservoir 9.

The emergency valve device 6 comprises a casing having a chamber 11 in constant communication with the pressure reservoir 9 through passage and pipe 12 and containing a rotary valve 13. The rotary valve 13 is provided axially on the seating side with an operating shaft 14 journaled in a suitable bore through the casing and extending outside of the casing, and is provided axially on the opposite side with a guide member 15 rotatably mounted in a suitable socket in the casing. Secured to the outer end of the operating shaft 14 is an operating lever 16 for turning the rotary valve from the emergency position shown in Fig. 5 to either the control position shown in Fig. 1 or the control position shown in Fig. 3, according to which end of the car is the operating or controlling end.

The rotary valve operating lever 16 is provided with two oppositely disposed arms 155 and 156 and projecting from the casing of the emergency valve device are two stop lugs 157 and 158 adapted to be engaged by said respective arms for defining the positions of the emergency valve device, as shown in Figs. 1 and 2, and 3 and 4. Two spaced spring barrels 159 and 160 are mounted on the casing of the emergency valve device. The barrel 159 contains a plunger 161 and a spring 162 acting on said plunger, the plunger 161 being provided with a finger 163 extending through an aperture in the end of said barrel and adapted to be engaged by the arm 155 on the rotary valve operating lever 16. The other spring barrel 160 contains a plunger 164 and a spring 165 acting on said plunger, the plunger 164 being provided with a finger 166 extending through an aperture in the end of the barrel 160 and adapted to be engaged by the arm 156 on the rotary valve operating lever 16.

The rotary valve operating lever 16 is provided with two electric contact members 167 and 168 which are suitably insulated from said lever and from each other, the contact member 167 being adapted to bridge two fixed contacts 169 and 170 when the lever 16 is in the position shown in Fig 2 of the drawings, while the contact member 168 is adapted to bridge said fixed contacts when the lever 16 is in the position shown in Fig. 4 of the drawings, but when the lever 16 is in the emergency position shown in Fig. 6, the fixed contact 169 engages contact member 167 while the fixed contact 170 engages contact member 168, which is insulated from contact member 167.

For the purpose of controlling the motive power on the car, a circuit breaker device is provided and comprises an electro-magnet 171 and a switch 175 operatively controlled by said magnet and operative upon energization thereof to close the circuit from the usual source of power, such as the trolley 172, to the usual controller 173 which in turn is adapted to control the supply of current to the usual car motor 174.

One terminal of the circuit breaker magnet 171 is connected to ground 176 while the other terminal leads to the fixed contact 169 on the emergency valve device. The other fixed contact 170 is connected to trolley 172, so that when the fixed contacts 169 and 170 are bridged by either the contact member 167 or the contact member 168, a circuit is closed through the magnet 171, so that current will be supplied to the controller 173 to permit moving of the car, but when the fixed contacts 169 and 170 are disconnected from each other, as when the rotary valve operating lever 16 is in the emergency position shown in Fig. 6, the circuit breaker magnet 171 is deenergized so as to cut off the current to the controller 173.

The brake valve device 1 at each end of the car comprises a casing containing two flexible diaphragms 17 and 18, the diaphragm 17 being subject on one side to the pressure of liquid in a control chamber 19, the diaphragm 18 being open at the opposite side to a chamber 20 which is normally open to the brake cylinder 7, while said diaphragms cooperate to form an intermediate chamber 21 which is at all times in communication with the sump reservoir 8 through pipes 22, 23 and 24.

Opening into the control chamber 19 is a bore 25 which is of small diameter as compared to the diameter of the diaphragm 17. A plunger or ram 26 is slidably mounted in said bore and is provided with a hollow guide member 27 extending through a suitable bore in the casing and containing a movable member 28 between which and plunger 26 is interposed a brake control spring 29. An enlarged portion 30 on the inner end of member 28 is provided to engage a shoulder in the guide member 27 for limiting outward movement of said member, and a button 31 is provided on the outer end of said member and is adapted to be engaged by the ball of an operator's foot for operating said member. The chamber 19 between the diaphragm 17 and the plunger 26 is adapted at all times to be completely filled with liquid.

The chamber 21 between the two diaphragms 17 and 18 contains a follower plate 32 engaging the diaphragm 17, a follower plate 33 engaging diaphragm 18 and a plurality of struts 34 connecting the follower plates 32 and 33. The casing is provided with a lug 35 extending into chamber 21 and having a through opening 42 through which one of the struts 34 freely extends. Said lug is provided with a chamber 36 open to the brake cylinder chamber 20 through a passage 37 and containing a brake release valve 38 having a fluted stem 39 extending through a suitable bore in lug 35 into chamber 21. A screw-threaded nut 40 closes one end of the chamber 36 and a spring 41 is interposed between said nut and the valve 38 for urging said valve to its seat.

The casing of the brake valve device 1 is provided with a chamber 43 at all times charged with liquid under pressure from the supply pipe 44 through connecting pipe 45. A brake application valve 46 is contained in chamber 43 and has a fluted stem 47 slidably extending through a suitable bore in the casing and into the brake cylinder chamber 20. One end of chamber 43 is closed by means of a nut 49 having screw-threaded engagement with the casing, and a spring 50 is interposed between said nut and the application valve 46 for urging said valve to its seat.

A lug 51, extending rearwardly of the brake valve casing, is provided with a through bore 52 in which is slidably mounted a plunger 53. One end of bore 52 is closed by means of a cover 54 having screw-threaded engagement with the casing and a spring 55 is interposed between cover 54 and the plunger 53 for urging said plunger outwardly.

A bell crank lever is pivotally mounted on an arm 56 projecting from the lug 51, and the arm 57 of said lever engages the plunger 53. The other arm 59 of the bell crank lever is connected preferably by means of a flexible cable 60 to a member 61 pivotally connected to the lever 16 of the emergency valve device 6.

The plunger 53 in the brake valve device 1 is provided interiorly with a boss 62 having a recess in which is slidably mounted one end of a removable push rod 63, the other end of said push rod extending through an opening in the cover 54 and carrying on its outer end a heel plate 64 adapted to receive the heel of an operator's shoe. The push rod 63 may be square in section and the opening in cover 54 through which said rod slidably extends may be of a corresponding shape so as to maintain the heel plate 64 properly positioned for operation.

The brake valve device further comprises a flexible diaphragm 66 having at one side a chamber 67 communicating through passage 68 with the sump chamber 21, and having at the opposite side a chamber 69. One way communication from chamber 69 to the brake cylinder chamber 20 is established through passage 70, past a check valve 71 contained in a chamber 72 and from thence through passages 73 and 37, while one way communication from the brake cylinder chamber 20 to chamber 69 is established through passages 37, 73, chamber 72, past a check valve 74 contained in a chamber 75, and from thence through a passage 76. A spring 77 in chamber 75 acts on the check valve 74 and urges said check valve towards its seat with a predetermined force.

A check valve 78 is contained in the chamber 67 for controlling communication from said chamber to a chamber 79, and an oppositely seating check valve 80 is contained in a chamber 81 for controlling communication from chamber 81 to chamber 79. Each of the check valves 78 and 80 is provided with a fluted stem operatively engaging each other in chamber 79. A spring 82 is interposed between a cap nut 83, having screw-threaded engagement with the casing, and the check valve 80 for urging said check valve into engagement with its seat and at the same time for unseating the check valve 78, while check valve 78 is provided with a stem 84 adapted to be engaged by the diaphragm 66 whereby deflection of said diaphragm in an upwardly direction will seat check valve 78 and unseat check valve 80.

A spring 85 is contained in the chamber 67 and acts on the diaphragm 66.

Both of the door engines 2 and 3 are the same in construction, each comprising a casing, a movable rack 86, a gear 87 meshed with said rack and through the medium of which a car door is opened and closed in the usual well known manner, a door closing piston 88 for moving the rack to the door closed position, as indicated in Fig. 1 of the drawings, and a door opening piston 89 for moving the rack in the opposite direction to the door open position.

The door closing piston 88 and door opening piston 89 are each provided with a stem 90 slidably mounted in a suitable bore in the end of the rack 86. A spring 91 is contained in a bore in the end of stem 90 and engages the rack at the bottom of the bore in the rack for urging the stem 90 outwardly, such outward movement being limited by the engagement of a shoulder 92 on the stem 90 with an apertured cover plate 93 secured to the end of the rack 86. According to this construction, after the rack 86 has been moved to the position in which the door is open or to the position in which the door is closed, the actuating piston 88 or 89, each of which is provided with a gasket 95, may continue to move relative to the rack until the gasket 95 effects sealing engagement with a seat rib 96 so as to prevent leakage of liquid under pressure from the actuating side of the piston to the low pressure side intermediate the pistons 88 and 89.

A stop 97, acted upon by a spring 98, is slidably mounted in a suitable bore in the casing and is adapted to be engaged by the door opening piston 89 in order to resiliently arrest the movement of the door engine parts in the door closed position, while a corresponding stop 97 and spring 98 are provided in the opposite end of the door engine to resiliently arrest the movement of the door engine parts in the door open position, as will be hereinafter more fully described.

The door valve 4, which is provided for controlling the operation of the entrance door engine 2, comprising a casing having a chamber 99 containing a rotary valve 100 adapted to be turned to the operating positions, shown in Figs. 1-1ᴬ and 7, through the medium of a shaft 101 on the outer end of which is removably mounted, at the operating end of the car, a manually operable handle 102.

The treadle operated door valve 5 comprises a casing having a valve chamber 103 containing two oppositely seating valves 104 and 105. A spring 106, acting on valve 105, is provided for unseating valve 105 and for seating valve 104, and a flexible diaphragm 107, having a pressure chamber 108 at one side and an atmospheric chamber at the opposite side, is adapted, upon deflection in a downwardly direction, to unseat the valve 104 and at the same time to seat the valve 105. A push rod 114, slidably mounted in the casing and engaging the diaphragm 107, is provided to deflect said diaphragm in a downwardly direction.

A treadle plate 109 is secured to the treadle operated door valve by means of a plurality of pins 110 extending through suitable openings in lugs 111 projecting from the treadle operated door valve casing, said pins being provided with heads 112 which are larger than the openings through the lugs 111. A spring 113 is provided around each of the pins 110 and is interposed between the treadle plate 109 and casing of the treadle operated door valve and urges the treadle plate to the normal position in which it is out of engagement with the valve push rod 114, as shown in the drawings.

The valve 104 in the treadle operated door valve 5 is adapted to control communication from chamber 103 to chamber 108 which communicates through passage 115 and past a check valve 116, contained in a chamber 117, with a door opening pipe 118 leading to chamber 119 at the outer face of door opening piston 89 in the door engine 3, while the valve 105 is adapted to control communication from said door opening pipe 118, through a passage 183, past a check valve 120 contained in a chamber 121, and through a passage 122 to chamber 103.

The brake cylinder 7 may be of any well known type, but for the purpose of illustration may comprise a casing containing a flexible diaphragm 123 having at one side a pressure chamber 124 and at the opposite side a non-pressure or atmospheric chamber 125. A diaphragm follower 126, contained in the non-pressure chamber 125, is pressed into engagement with the diaphragm 123 by means of the usual brake release spring 127 and is provided with a push rod 128 for applying the brakes, said push rod slidably extending through a suitable opening in the casing.

The liquid pump 10 is of the reversible gear type comprising a casing having a chamber containing a driver gear 129 and another chamber containing a driven gear 130 meshing with the gear 129. The driver gear 129 may be driven from the axle (not shown) of the car or in any other suitable manner, the means for driving said driver gear forming no part of the present invention.

A liquid supply chamber 131, communicating through passage 132 and pipe 133 with the sump reservoir 8, is provided at one side of the driver gear 129, while a similar liquid supply chamber 134, communicating through passage 135 and pipe 133 with the sump reservoir 8, is provided at the opposite side of the driven gear 130. The discharge of liquid from the gears 129 and 130 will, when the driver gear 129 is rotated in a clockwise direction, occur into passage 136 and from thence past a check valve 137, contained in a chamber 138, to a passage 139, while if the driver gear is rotated in the opposite direction, the discharge will occur through passage 140 and from thence past a check valve 141, contained in a chamber 142, to passage 139. The check valve 141 is provided to prevent back flow of liquid under pressure from passage 139 to passage 140 leading to the low pressure or inlet side of the gears 129 and 130 when the driver gear is being rotated in a clockwise direction, while the check valve 137 is provided to prevent back flow of liquid under pressure to passage 136 leading to the low pressure side of the pump gears when the driver gear 129 is being rotated in a counter-clockwise direction.

The discharge passage 139 in the pump 10 is open through pipe 143 and past a check valve 144 to the supply reservoir 9, the check valve 144 being provided to prevent loss of liquid under pressure from the pressure reservoir 9 in case the pipe 143 should become broken and also, the check valve 144 acts in conjunction with the two check valves 141 and 137 to prevent back flow from the pressure reservoir 9 to the sump reservoir 8 in case of leakage through the pump 10 when said pump is not operating.

It will be noted that the check valve 144 is contained in a chamber 210 formed in a member 211 which may be secured to the reservoir 9 in any suitable manner, such as welding or brazing. The outer open end of chamber 210 is closed by a cover 212 which may be secured to the member 211 by screw-threaded engagement, said member having a passageway 213 connecting pipe 143 to the seat of the check valve 144, which seat may be provided on said member.

A pressure limiting valve device 146 is interposed between the pump discharge pipe 143 and a pipe 147 leading to the sump reservoir 8 and comprises a valve 148 subject on its seating side to the pressure of liquid in the pump discharge pipe 143. The valve 148 is contained in a chamber 149, which is open to pipe 147, and a spring 150 is also contained in said chamber and acts on the valve 148 for holding said valve seated until a predetermined pressure is obtained in the discharge pipe 143 and pressure reservoir 9, at which time said valve is adapted to open and permit liquid under pressure to flow from pipe 143 to chamber 149 and from thence through pipe 147 to the sump reservoir 8 and thereby prevent the pressure in the pressure reservoir 9 from exceeding a predetermined fixed degree.

In order to prepare the equipment for operation, the sump reservoir 8, which is at all times open to the atmosphere through a breather pipe 151, is filled with liquid, such as oil, and the pump 10 is then operated to draw the oil from said sump reservoir and force it into the pressure reservoir 9.

The pressure reservoir 9 is initially at atmospheric pressure and as liquid is forced into said reservoir, the air in said reservoir is compressed until the pressure exerted on the liquid in said reservoir is sufficient to overcome the opposing pressure of spring 150 acting on the pressure limiting valve 148, when said valve is unseated to permit the escape of liquid pumped into pipe 143 to pipe 147 and from thence back into the sump reservoir 8, so that no more liquid will be forced into the pressure reservoir 9. It will be evident that as liquid is drawn from the pressure reservoir 9 in controlling the brakes, as will be hereinafter described, the pressure in said reservoir and in pipe 143 will reduce, at which time the pressure of spring 150 will seat the pressure limiting valve 148 so that liquid will again be forced into the pressure reservoir 9 until the pressure in said reservoir is restored to the desired predetermined value.

The air at atmospheric pressure initially contained in the pressure reservoir 9 is compressed into a space, such as the space 152 above the liquid, by the liquid pumped into said reservoir, and this air under pressure in space 152 is employed, due to its great and rapid expansibility, as the medium for rapidly propelling liquid through the brake system and applying pressure to the liquid in the control of the car brakes and car doors.

The liquid under pressure in the pressure reservoir 9 flows through pipe and passage 12 to the rotary valve chamber 11 and to the seat of the rotary valve 13 in the emergency valve device 6.

With no heel pressure applied to the heel plate 64 on the brake valve device at the operating end of the car, the centering springs 162 and 165 acting on the arms 155 and 156 of the emergency valve operating lever 16, hold lever 16 and the rotary valve 13, which is turned by said lever, in the central, or emergency position, as shown in Fig. 5. In this position of the rotary valve 13, liquid under pressure in the supply reservoir passage 12 flows through a cavity 178 in said rotary valve to passages 179 and 180.

Liquid thus supplied to passage 179 flows through pipe 181 to the brake cylinder pressure chamber 124 thus filling said chamber with liquid, while the liquid supplied to passage 180 flows through pipe 182 to chamber 103 in the treadle operated door valve device 5 at each end of the car. Now in order to fill the treadle controlled door valve 5 and the chamber 119 in exit door engine 3 with liquid, the treadle 109, at both ends of the car, is depressed and unseats the valve 104, and this permits liquid under pressure to flow from chamber 103 to chamber 108 and thence through passage 115, past check valve 116 to chamber 117, and from thence through pipe 118 to the exit door engine piston chamber 119, and also from chamber 117 through passage 183 past check valve 120 to chamber 121 and passage 122 leading to the seat side of the valve 105. After the chamber 119 in the exit door engine is thus filled with liquid, the treadle 109 is relieved of pressure, permitting springs 113 to lift said treadle out of engagement with push rod 114 and this permits spring 106 to unseat valve 105 and to seat valve 104.

After the brake cylinder 7, the treadle controlled door valve devices 5 and chamber 119 in the exit door engines 3 are thus filled with liquid, the operator applies heel pressure to the heel plate 64 at the operating end of the car. In the present instance, it will be assumed that the equipment is to be operated or controlled from the left hand end, as viewed in Figs. 1–1A of the drawings, while the right hand end will be the non-operating end.

The heel plate 64 is depressed by the operator's heel and this rotates the bell crank lever arms 57 and 59 so that, by means of the cable 60, the emergency valve operating lever 16 and consequently the rotary valve 13, are turned to the position shown in Figs. 1, 1A and 2. This turning movement of the emergency valve operating lever 16 is limited by engagement of said arm with the stop lug 157 on the casing, which lug defines the normal operating position when the car is controlled from the left hand end. The turning of the lever 16 acts through cable 60, extending to the non-operating end of the car to turn the bell crank lever arms 57 and 59 and push the plunger 53, in the brake valve device at the non-operating end of the car, upwardly into the bore 52 against the pressure of spring 55, which spring is provided to hold said cable, bell crank lever arms and plunger under stress so as to prevent rattling of these parts at the non-operating end of the car.

With the emergency valve device 6 conditioned as shown in Figs. 1 and 1A, the brake cylinder 7 is connected to the sump reservoir 8 through pipe 181 passages 179, cavity 184 in rotary valve 13, passages 185, pipe 186 leading to the brake valve device, passages 73 and 37 in the brake valve device, chamber 36, past the normally unseated brake release valve 38 to chamber 21 which is at all times open to the sump reservoir 8 through pipes 22, 23 and 24. The pressure on the liquid in chamber 124 of the brake cylinder is thus relieved, and at the same time, the pressure is relieved in the door opening chamber 119 of the exit door engine 3 through pipe 118, passage 183 in the treadle controlled door valve device 5, past check valve 120, through passage 122, past valve 105, through chamber 103, pipe 182, passage 180 in the emergency valve device, cavity 195 in the rotary valve 13, passage 196, and pipes 197, 23 and 24 opening into the sump reservoir 8.

With the emergency valve device conditioned, as shown in Figs. 1 and 2, liquid under pressure supplied to the rotary valve chamber 11, flows through port 137 in the rotary valve 13 and from thence through passage 188 to the pressure supply pipe 44 which extends to both ends of the car.

At both ends of the car, liquid under pressure flows from the pressure supply pipe 44 through pipe 45 to the brake valve device and from thence through passage 190 to the brake application valve chamber 43, and from said chamber through passage 191 to chamber 81 containing the valve 80. Liquid under pressure also flows from the supply pipe 44, through pipe 192 at both ends of the car to the door closing piston chamber 189 in the exit door engine 3 and since the door opening piston chamber 119 is at this time open to the sump reservoir 8, as hereinbefore described, the door engine parts are moved by the pressure of liquid acting on the door closing piston 88 to the door closed position, as shown in Fig. 1 of the drawings. At both ends of the car, liquid under pressure also flows from the supply pipe 44 to the rotary valve chamber 99 in the door valve device 4, and from said chamber, with the door valve device 4 in the door closing position as shown in Fig. 1, liquid under pressure flows through a port 193 in the rotary valve 100 to pipe 194 leading to the door closing piston chamber 189 in the entrance door engine 2.

At the operating or control end of the car, the operator may now apply pressure to the button 31 by means of the ball of the foot which is holding the heel plate 64 in the depressed condition. The button 31 is thus operated to compress spring 29, the pressure of which acts to move the plunger 26 downwardly so as to cause a displacement of the liquid in chambers 25 and 19, which displacement deflects the diaphragm 17 downwardly. This deflection of diaphragm 17 acts through the follower plate 32 and struts 34 to move the follower plate 33 away from the stem of the brake release valve 38 so as to permit spring 36 to seat said valve. Further deflection of diaphragm 17 and consequent movement of follower plate 33 deflects the diaphragm 18 so as to unseat the brake application valve 46, which permits liquid under pressure, supplied from supply pipe 44 through pipe 45 and passage 190 to chamber 43, to flow from chamber 43 to chamber 29 and from thence through passages 37 and 73, pipe 186, passage 185 in the emergency valve device, cavity 184 in the rotary valve 13, passage 179 and pipe 181 to the brake cylinder piston chamber 124. Liquid under pressure thus supplied to the brake cylinder passage 73 in the brake valve device flows to check valve chamber 72 and acts to unseat the valve 74. When a predetermined pressure acting on valve 74 is thus obtained said valve is unseated against the pressure of spring 77 and this permits liquid under pressure to flow past said valve to chamber 75 and from thence through port 76 to diaphragm chamber 69. The diaphragm 66 is deflected upwardly by the pressure of liquid supplied to chamber 69 and acts to seat valve 78 and unseat the valve 80.

The unseating of valve 80 admits liquid under pressure from chamber 81 to chamber 79 from whence it flows through passage and pipe 203 to the seat of the rotary valve 100 in the operator's door control valve device 4. The operator turns the handle 102 and consequently the rotary valve 100 in the door valve device 4 from the door closing position, as shown in Fig. 1, to the door opening position, as shown in Fig. 7. In the door opening position, liquid under pressure supplied through pipe 203 to the seat of the rotary valve flows through cavity 198 in the rotary valve 100 to the door opening pipe 199 and from thence to the door opening piston chamber 119 in the entrance door engine 2. After filling the chamber 119 with liquid, the door valve 4 is returned to the door closing position, as shown in Fig. 1, in which the door opening pipe 199 is opened to the sump reservoir 8 through cavity 200 in the rotary valve and pipes 23 and 24, thereby relieving the pressure on the liquid in the door opening pipe 199 and door opening piston chamber 119 in the entrance door engine 2. In the door closing position of the door valve 4 the door closing pipe 194 is again opened through port 193 in the rotary valve to the rotary valve chamber 99, so as to again supply liquid under pressure through said pipe to the door closing piston chamber 189 in the entrance door engine 2.

At the right hand or non-operating end of the car, as shown in Fig. 1A, where the door valve 4 is carried in the door closing position, liquid under pressure is supplied from the rotary valve chamber 99 through port 193 and door closing pipe 194 to the door closing end of the non-operating entrance door engine 2 and therefore holds the door engine in the door closed position, as desired.

The operator may now relieve foot pressure on the button 31 at the operating end of the car, which permits the pressure of liquid in chamber 20 acting on diaphragm 18 to return said diaphragm and the diaphragm 17 to their normal position, and this permits spring 50 to seat the brake application valve 46 so as to cut off the supply of liquid under pressure to chamber 20. After the valve 39 is seated, the continued deflection of diaphragms 18 and 17 causes the follower plate 33 to engage and unseat the brake release valve 38 past which the brake cylinder pressure chamber 124 is opened to the sump reservoir 8 through pipe 181, passage 179 in the emergency valve device 6, cavity 184 in the rotary valve 13, passage 185, pipe 186, passages 73 and 37 in the brake valve device, release valve chamber 36, past the release valve 38 to the sump chamber 21 and from thence through pipes 22, 23 and 24 to the sump reservoir 8, so that the pressure is relieved on the liquid in the brake cylinder piston chamber 124.

As the pressure is relieved on the liquid in the brake cylinder by connecting the brake cylinder to the sump reservoir by way of passage 73 in the brake valve device, the pressure is also relieved in diaphragm chamber 69 which is open to passage 73 through passage 70, past the check valve 71 and through chamber 72, and this permits spring 85 to return diaphragm 66 to its normal position so that spring 82 may seat valve 80 and cut off the supply of liquid under pressure to pipe 203 leading to the door valve device 4. The seating of valve 80 unseats valve 78 so that pipe 203 is opened to chamber 67 and from thence through passage 68 to the sump chamber 21 in the brake valve device, thereby relieving the pressure in pipe 203.

In the manner above described, the door closing piston chamber 189 of the door engines is supplied with liquid under pressure to hold the door engines in the door closed position, while the door opening piston chamber 119 of said engines, the brake cylinder pressure chamber 124, the chambers in the treadle door control valve devices 5, certain chambers in the brake valve devices and the connecting control pipes are all open to the sump reservoir 8 but substantially filled with liquid under atmospheric pressure, so that in the operation of the equipment in service, as will be hereinafter described, the applying and releasing of the brakes and the opening and closing of the car doors will be effected substantially with the mere application of pressure to the liquid with which the system is substantially filled, the actual movement of liquid through the system being reduced to a minimum, and since pressure is applied to the liquid through the medium of the highly expansible air under pressure in the space 152 in the pressure reservoir 9, the small amount of liquid which will be moved in the various controlling operations and the application of pressure to the liquid in the various parts of the system may be as rapid as desired.

With the brake equipment conditioned, as above described, for controlling a car, if it is desired to effect an application of the brakes, the operator depresses the button 31 on the brake valve device 1 at the left hand end or operating end of the car by means of the ball of the foot with which he is holding the heel plate 64 depressed.

The depressing of button 31 acts through spring 29 to move the plunger 26 inwardly causing a displacement of the liquid in the chambers 25 and 19. This displacement of liquid moves the diagrams 17 and 18 downwardly, permitting spring 41 to seat the brake release valve 38 and then upon further movement the diaphragm 18 engages and unseats the brake application valve 46.

The unseating of the brake application valve 46 establishes communication from the pressure supply pipe 44 to the brake cylinder pressure chamber 124 through pipe 45, passage 190, chamber 43, past valve 46, through chamber 20, passages 37 and 73, pipe 186, passage 185 in the emergency valve device, cavity 184 in the rotary valve 113, passage 179 and from thence through pipe 181, and through said communication pressure is applied to the column of liquid leading to and that contained in the brake cylinder for deflecting the brake cylinder diaphragm 123 outwardly into the non-pressure chamber 125 for applying the brakes.

When the pressure obtained in chamber 20 in the brake valve device, and consequently in the brake cylinder 7, and acting on diaphragm 18 in said brake device, becomes slightly greater than the opposing pressure of the control spring 29, said diaphragm is deflected upwardly permitting the brake application valve 46 to seat so as to prevent further increase in pressure in chamber 20 and in the brake cylinder chamber 124. This deflection of diaphragm 18, and consequently of diaphragm 17, effects a displacement of liquid in chambers 19 and 25 causing the plunger 26 to move upwardly, relative to the button 31, thus compressing the control spring 29, the increase in pressure in which stops said deflection before the follower plate 18 engages and unseats the brake release valve 38. The brake valve device thus automatically moves to what may be called a lap position in which the liquid under pressure is bottled in the brake cylinder chamber 124, when the pressure of liquid obtained in said chamber is increased to a degree substantially in proportion to the pressure of the control spring 29.

If, in applying the brakes as just described, the button 31 is depressed to a position in which only a partial application of the brakes is obtained, then in order to increase the degree of application, the button 31 is further depressed, thereby increasing the pressure of the control spring 29 on the liquid in chambers 25 and 19. This causes displacement of the liquid in chambers 25 and 19 which results in the deflection of diaphragms 17 and 18 to again open the brake application valve 46 and thus establish communication from the pressure supply chamber 43 to chamber 20 and from thence to the brake cylinder pressure chamber 124 in the manner hereinbefore described. When the pressure in chamber 20 and brake cylinder chamber 124 is thus increased to a degree slightly exceeding the increased pressure of the control spring 29, the brake valve device again moves to lap position. By thus depressing the button 31 in steps and causing corresponding stages of increase in the pressure of the control spring 29, the pressure of liquid in the brake cylinder chamber 124 can be increased in such steps as desired and thereby effect a graduated application of the brakes.

In effecting an application of the brakes, the pressure of the liquid in chamber 72 in the brake valve device increases as the pressure increases in chamber 20 and in the brake cylinder chamber 124 since chamber 72 is at all times in direct communication with chamber 20 through passages 73 and 37. When the brake cylinder pressure has been increased to a predetermined degree, such as will ensure stopping of the car, the substantially corresponding pressure acting in chamber 72 on the valve 74 in the brake valve device, overcomes the opposing predetermined pressure of spring 77 and unseats the valve 74 which admits liquid under pressure to chamber 75 and from thence through passage 76 to chamber 69. The consequent increase in pressure in chamber 69 deflects the diaphragm 66 upwardly to seat valve 78 and unseat valve 80 which admits liquid under pressure from chamber 81 to chamber 79 and from thence through passage and pipe 203 to the seat of the rotary valve 100 in the operator's door valve 4, it being understood, as hereinbefore described, that said chamber 81 is supplied with liquid under pressure from the supply pipe 44 through pipe 45, passage 190 in the brake valve device, valve chamber 43 and from thence through passage 191.

After having effected a predetermined application of the brakes and thus obtaining liquid under pressure in pipe 203 leading to the operator's door valve device 4, if the operator desires to open the entrance door 2 at the operating end of the car to take on passengers, he turns the door valve device 4 from the door closed position as shown in Fig. 1 to the door open position, as shown in Fig. 7.

In the door open position of the door valve device 4, the door closing piston chamber 189 in the entrance door engine 2 is opened to the sump reservoir 8 through pipe 194, cavity 201 in the rotary valve 100 and pipes 23 and 24, thus relieving the pressure on the door closing piston 88. At the same time, liquid under pressure is supplied from pipe 203 to the door opening piston chamber 119 through cavity 198 in the door valve rotary valve 100, and from cavity 198 through pipe 199.

The pressure thus applied to the door opening piston 89 operates said piston to move the door engine parts towards the left hand and such movement may be limited by stops (not shown) engageable by the car doors (not shown) in the door open position or in any other suitable manner such as will stop the movement of the door closing piston 88 and rack 86 in a position in which the piston 88 will just clear the casing. Just before the movement of the door closing piston 88 and rack 86 is stopped, said piston engages the movable member 97 so that the remainder of the movement of said piston and rack is resiliently opposed by the pressure of spring 98 which is provided to prevent slamming of the door (not shown) into the door open position, so as to prevent breakage of parts. After the rack 86 is stopped in the door open position, the door opening piston 89 continues to move relative to said rack, due to the telescoping of stem 90 within the rack, until the gasket 95 on the back of said piston engages the seat rib 96 in the casing. The leak-proof seal thus obtained between gasket 95 and seat rib 96 is provided to reduce to a minimum the possibility of leakage of liquid under pressure from the pressure chamber 119 to the chamber intermediate the pistons 88 and 89.

When the operator desires to operate the door engine 2 to close the entrance door (not shown) he turns the door valve device 4 from the door opening position, as shown in Fig. 7, to the door closing position, as shown in Fig. 1. In the door closing position, the door opening piston chamber 119 is opened to the sump reservoir 8 through pipe 199, cavity 200 in the rotary valve 100 of the door valve device 4 and pipes 23 and 24, so that the pressure acting on the liquid in said chamber 119 is relieved. At the same time, liquid under pressure is supplied from the supply pipe 44 through the rotary valve chamber 99 in the door valve device 4, port 193 in the rotary valve 100 and pipe 194 to the door closing piston chamber 189, so that the door closing piston 88 is operated to move the door engine parts to the door closing position, the spring 98 in the door opening end of the engine serving to cushion the stopping of the parts in the door closed position, and the piston 88 moves into sealing engagement with the seat rib 95, in the same manner as when the door engine is operated to open the car door (not shown).

In order to release the brakes after an application, the operator relieves the button 31 of pressure which permits the control spring 29 to expand to its normal condition and relieve pressure on the plunger 26. The liquid at brake cylinder pressure acting in chamber 20 on diaphragm 18 then deflects said diaphragm and diaphragm 17 upwardly to their normal position, and in so doing, the follower plate 33 engages and unseats the brake release valve 38.

The unseating of the brake release valve 38 opens the brake cylinder pressure chamber 124 to the sump reservoir 8 by way of pipe 181, passage 179 in the emergency valve device, cavity 184 in the rotary valve 13, passage 185, pipe 186, passages 73 and 37 in the brake valve device, chamber 36, past the release valve 38 to the sump chamber 21 and from thence through pipes 22, 23 and 24 to the sump reservoir 8. The pressure in the brake cylinder chamber 124 and in chamber 20 in the brake valve device being thus completely reduced permits a release of the brakes.

In case it is desired to graduate the release of brakes, the operator permits the button 31 to move up only a distance according to the degree of release which is desired. The consequent reduction in the pressure of control spring 29 permits deflection of diaphragms 18 and 17, by the brake cylinder pressure in chamber 20, to open the release valve 38 and permit the brake cylinder pressure and the pressure in chamber 20 to reduce to a degree slightly below the opposing, though reduced, pressure of the control spring 29 at which time the pressure of said spring will cause reverse deflection of said diaphragms to permit the release valve 38 to seat so as to prevent further reduction in brake cylinder pressure. Then if the operator further relieves the pressure on the control spring 29, a further and proportional reduction in pressure in the brake cylinder and chamber 20 will occur. In this manner, the operator may graduate the release of the brakes, as desired.

In releasing the brakes, the pressure of the liquid in chamber 69 in the brake valve device reduces with the reduction in brake cylinder pressure on account of the communication through passage 70, past check valve 71 and through chamber 72 to passage 73 through which passage the brake cylinder pressure is reduced. When the pressure in chamber 69 is thus reduced to below the opposing pressure of spring 85, said spring deflects diaphragm 66 downwardly to its normal position which permits spring 82 to seat valve 80 and unseat valve 78. The seating of valve 80 closes communication from the pressure supply chamber 81 to chamber 79 while the unseating of valve 78 opens chamber 79, and consequently pipe 203 leading to the door valve device 4, to chamber 67 and from thence through passage 68 to sump chamber 21 which is at all times open to the sump reservoir 8. By thus opening the pipe 203 to the sump reservoir 8, in releasing the brakes, the supply of liquid under pressure for operating the entrance door engine 2 to open the entrance door is cut off so that said door can not be opened, as hereinbefore described, by operation of the door valve device 4.

In order to permit a passenger to operate the exit door engine 3 so that the passenger may get off of the car, the operator removes heel pressure from the heel plate 64. This permits the centering spring 162 on the emergency valve device 6 to turn the arm 155 and consequently the operating lever 16 and rotary valve 13 in a clockwise direction until the arm 156 engages the finger 166. The finger 166, being subject to the pressure of the centering spring 165, stops the rotation of the lever 16 and rotary valve 13 in the emergency position, as shown in Figs. 5 and 6.

In the emergency position of the rotary valve 13, liquid under pressure flows from the supply reservoir 9 through pipe 12 and passage 12, cavity 178 in said rotary valve and passage 179 to pipe 181 leading to the brake cylinder pressure chamber 124, and at the same time liquid under pressure is supplied from said cavity to passage 180 and from thence through pipe 182 to valve chamber 183 in the treadle operated door valve device 5 at both ends of the car.

The brakes are thus applied through the emergency valve device 6 so as to stop the car, and liquid under pressure is supplied to the treadle door valve device 5, so that a passenger at either the front end or rear end of the car, may step on the treadle plate 109 which, through the medium of push rod 114 and diaphragm 107, acts to unseat the valve 104 and seat the valve 105. With valve 104 unseated, liquid under pressure flows from chamber 103 to chamber 108, then through passage 115, past check valve 116 to chamber 117 and from thence through pipe 118 to the door opening piston chamber 119 in the exit door engine 3. The door closing piston chamber 189 is at this time open to the sump reservoir 8 through pipe 192, the normal pressure supply pipe 44, passage 188 in the emergency valve device, cavity 202 in rotary valve 13, passage 196 and pipes 197, 23 and 24, so that the liquid under pressure supplied to chamber 119 and acting on the door opening piston 89 moves the door engine parts to the door opening position in which the passenger may get off the car.

When the pressure of a passenger's foot is removed from the treadle plate 109, springs 113 return said plate to its normal position out of engagement with the rod 114 and this permits spring 106 to unseat valve 105 and seat valve 104, so that, when the heel plate 64 is again depressed by the operator to turn the rotary valve 13 of the emergency valve device to the normal operating position shown in Fig. 1, liquid under pressure is released from the door opening piston chamber 119 in the exit door engine 3 through pipe 118, passage 103 in the treadle controlled door valve device 5, past the check valve 120, through chamber 121, passage 122, past the valve 105, through chamber 103, pipe 182, passage 180 in the emergency valve device, cavity 195 in rotary valve 13, passage 196 and from thence through pipes 197, 23 and 24 to the sump reservoir 8. With the emergency valve device 6 in the position shown in Fig. 1, liquid under pressure is again supplied to the pressure supply pipe 44, in the manner hereinbefore described, and from said pipe through pipe 192 to the door closing piston chamber 189 in the exit door engine 3, so that with the door opening piston chamber 119 open to the sump reservoir 8, the exit door engine parts will be moved to the door closing position.

When the emergency valve device 6 is moved to its normal operating position, as shown in Fig. 1, to relieve the pressure in pipe 182 leading to the treadle operated door valve device 5, the brake cylinder pressure chamber 124 is also opened to the sump reservoir 8 through pipe 181, passage 179 in the emergency valve device 6, cavity 184 in the rotary valve 13, passage 185, pipe 186, passages 73 and 37 in the brake valve device, past the unseated release valve 38 to chamber 21 and from thence through pipes 22, 23 and 24, thus releasing the brakes.

When liquid under pressure is supplied to the treadle controlled door valve device 5, by operation of the emergency valve device 6 as above described, the check valve 120 prevents flow of liquid under pressure past the normally unseated valve 105 to the door opening pipe 118, so that the exit door engine 3 will not be operated to open the exit door until the treadle 109 is depressed by a passenger. The check valve 116 is provided to prevent release of liquid under pressure from the door opening pipe 118 while a passenger is standing on the treadle plate 109 and the release valve 105 is seated, so that even though the operator should turn the emergency valve device from the emergency position as shown in Figs. 5 and 6, to the operating position as shown in Figs. 1 and 2, the liquid under pressure holding the exit door engine 3 in the open position will not be released until the passenger has removed foot pressure from the treadle plate 109. By thus holding the door opening pressure in the door opening piston chamber 119 until the passenger removes foot pressure from the treadle plate 109, the exit door will remain open even though liquid under pressure is again supplied to the door closing piston chamber 189 which would merely place the door engine pistons 88 and 89 in equilibrium with respect to the opposing actuating liquid pressures.

If for any other reason, such as in case of emergency or incapacitation of the operator, the operator should remove heel pressure from the heel plate 64, it will be evident, that the car brakes will be automatically applied and liquid under pressure will be supplied to the treadle operated door valve device 5 so that passengers may get off of the car. Furthermore, since in emergency position of the emergency valve device 6, the pressure supply pipe 44 is opened to the sump reservoir 8 through passage 188 in the emergency valve device, cavity 202 in the rotary valve 13, passage 196, and pipes 197, 23 and 24, liquid under pressure is released from the door closing piston chamber 189 of the entrance door engine 2 through pipe 194, port 193 in rotary valve 100 of the door valve 4, chamber 99 and from thence through the supply pipe 44, and since the door opening piston chamber 119 of the entrance door engine 2 is normally open to the sump reservoir 8 through pipe 199, cavity 200 in the rotary valve 100 and pipes 23 and 24, the opposing pressures acting on the entrance door engine pistons 88 and 89 are equalized, so that said door engine will not oppose opening of the entrance door by hand in the usual manner, so that passengers may also exit through the entrance door.

In order to effect a release of the brakes and operate both door engines 2 and 3 to close their respective doors after an emergency application of the brakes, the operator depresses the heel plate 64 and pulls the emergency valve device to its normal position, and with no pressure applied to the push button 31, the brake cylinder pressure chamber 124 and the door opening piston chamber 119 of door engines 2 and 3 are connected to the sump reservoir 8, and liquid under pressure is supplied to the door closing piston chamber 189 of said engines, so that the car doors will be closed, in the same manner as hereinbefore described.

If the operator desires to change operating ends, he relieves the heel plate 64 of heel pressure which causes the brakes to be applied and then by means of said heel plate pulls the push rod 63 out of the brake valve device. He also removes the door valve operating handle 102 from the door valve device 4 in the door closed position of said device and applies said handle and the push rod 63 and heel plate 64 to the door valve device 4 and brake valve device 1 at the opposite end of the car, which in the present case will be the right hand end of the equipment, as shown in Fig. 1A of the drawings. Then, to operate the car, he depresses the heel plate 64 to its normal operating position and in so doing pulls the emergency valve operating lever 16 and rotary valve 13 to the operating position shown in Figs. 3 and 4.

With the rotary valve 13 in the position shown in Fig. 3, liquid under pressure is supplied from the rotary valve chamber 11 to the pressure supply pipe 44 through a port 204 in said rotary valve and passage 188, the treadle operated door valve pressure supply pipe 182 is opened to the sump reservoir 8 through passage 180, a cavity 208 in the rotary valve 13, passage 196 and pipes 197, 23 and 24, and the brake cylinder pressure chamber 124 is connected to the brake valve device 1 at the operating end of the car through pipe 181, passage 179, cavity 205 in the rotary valve 13, passage 206 and pipe 186. With the communications just described established, the operation of the car brakes and doors is the same as when the operating end of the car was at the opposite end of the car, as has been hereinbefore fully described.

When the heel plate 64 is depressed, as shown in Fig. 1 of the drawings, the contact 167 carried by the emergency valve operating lever 16, bridges the two fixed contacts 169 and 170 so as to close a circuit from the trolley 172 through the circuit breaker magnet 171 to ground 176. The magnet 171 is thus energized and operates the switch 175 to connect trolley 172 to the controller 173 which may then be operated by the operator to control the supply of current to the car motor 174 in the usual well known manner. With the heel plate 64 applied to the brake valve device 1 at the opposite end of the car and depressed, the contact 168 on the emergency valve operating lever 16 bridges the two fixed contacts 169 and 170, as shown in Fig. 4, so as to close the circuit through the circuit breaker magnet 171 so as to supply current from trolley 172 to the controller 173. However, when the emergency valve device moves to the emergency position, as shown in Figs. 5 and 6, contact 167 engages fixed contact 169, while contact 168 engages fixed contact 170, and since contacts 167 and 168 are insulated from each other, the circuit through the circuit breaker magnet 171 is opened. The magnet 171 is thus denergized which permits switch 175 to operate to open the circuit from trolley 172 to controller 173, thereby cutting off the supply of current to the car motor 174 when an emergency application of the brakes is effected.

It will now be noted, that the emergency valve device 6 has one position for conditioning the brake equipment to be controlled from one end of the car, another position for conditioning the brake equipment to be controlled from the opposite end of the car and an intermediate position for effecting an emergency application of the brakes, for supplying liquid under pressure to the treadle operated door valve device 5 and for balancing the liquid pressures acting on the entrance door engine 2. The emergency valve device is moved to and maintained in either of the two first above mentioned positions by pressure from the heel of an operator's foot so that the brakes may be controlled by the brake valve device which is operative by the ball of said foot, and said emergency valve device automatically moves to the emergency position upon the relief of heel pressure.

It will be evident that in this equipment, compressed air or any other fluid under pressure may be employed, instead of a liquid under pressure, as the medium for applying the brakes and for effecting the opening and closing of the car doors, and while only one illustrative embodiment of the invention has been shown and described in detail, it is not my intention to limit the scope of the invention otherwise than by the terms of the appended claims.

Having now described my invention, what I claim as new and desire to secure by Letters Patent, is:

1. In a fluid pressure brake, the combination with a brake valve device at one end of a car for controlling the brakes on a car, of valve means for controlling the operation of said brake valve device and movable to one position for effecting an application of the brakes and movable to another position for rendering said brake valve device ineffective to control the brakes, pressure means urging said valve means from the last position to the first, and manually operated means for holding said valve means in said second position against said pressure means.

2. In a fluid pressure brake, the combination with two brake valve devices, one at each end of a car, either of said brake valve devices being operable to control the brakes on the car, of valve means movable to a position for rendering the brake valve device at one end of the car ineffective to control the brakes on the car, resilient means opposing movement of said valve means to said position, and means operable by manual pressure against the opposing pressure of said resilient means to move said valve means to and then maintain said valve means in said position.

3. In a fluid pressure brake, the combination with two brake valve devices, one at each end of a car, either of said brake valve devices being operable to control the brakes on the car, of valve means having one position for rendering one of said brake valve devices ineffective to control the brakes and having another position for rendering the other brake valve device ineffective to control the brakes, and manually operated means at each end of the car, one operative to move said valve means to one of said positions and the other operative to move said valve means to the other of said positions.

4. In a fluid pressure brake, the combination with two brake valve devices, one at each end of a car, either of said brake valve devices being operable to control the brakes on the car, of valve means having one position for rendering one of said brake valve devices ineffective to control the brakes and having another position for rendering the other brake valve device ineffective to control the brakes, a member at each end of the car movable by manual effort, means operatively connecting said member to said valve means, said member at one end of the car being operative through said means to move said valve means to one of said positions for rendering the brake valve device at the other end of the car ineffective to control the brakes, and resilient means operative upon the relief of manual effort on said member for moving said valve means to another position for effecting an application of the brakes independently of both of said brake valve devices.

5. In a fluid pressure brake, the combination with two brake valve devices, one at each end of a car, either of said brake valve devices being operable to control the brakes on the car, of valve means movable to a position for rendering the brake valve device at one end of the car ineffective to control the brakes on the car, means for maintaining said valve means in said position by manually applied pressure, and resilient means operative upon the relief of said manually applied pressure for operating said valve means to effect an application of the brakes.

6. In a fluid pressure brake, the combination with two brake valve devices, one at each end of a car, either of said brake valve devices being operable to control the brakes on the car, of valve means movable to a position for rendering the brake valve device at one end of the car ineffective to control the brakes on the car, means for maintaining said valve means in said position by manually applied pressure, and resilient means operative upon the relief of said manually applied pressure for operating said valve means to effect an application of the brakes and for rendering both of said brake valve devices ineffective to control the brakes.

7. In a fluid pressure brake, the combination with two brake valve devices, one at each end of a car, either of said brake valve devices being operable to control the brakes on the car, of valve means having one position for rendering one of said brake valve devices ineffective to control the brakes and having another position for rendering the other brake valve device ineffective to control the brakes, manually controlled means at both ends of the car for controlling the positioning of said valve means and operative at the one end of the car, only when subject to continually acting manual effort, for positioning said valve means to render the brake valve device at the other end of the car ineffective to control the brakes on the car.

8. In a fluid pressure brake, the combination with a brake valve device at each end of the car controlled by an operator's foot, either of said brake valve devices being operative to control the brakes on said car, of valve means having one position for rendering one of said brake valve devices ineffective to control the brakes, and having another position for rendering the other of said brake valve devices ineffective to control the brakes, and means at each end of the car connected to said valve means and operated at one end of the car by pressure from the operator's foot employed to control the brake valve device at said end of the car, for rendering the brake valve device at said end of the car effective to control the brakes and for rendering the brake valve device at the other end of the car ineffective to control the brakes.

9. In a fluid pressure brake, the combination with a brake valve device at each end of the car controlled by an operator's foot, either of said brake valve devices being operative to control the brakes on said car, of valve means having one position for rendering one of said brake valve devices ineffective to control the brakes, and having another position for rendering the other of said brake valve devices ineffective to control the brakes, means operatively connected to said valve means for positioning said valve means, a member at one end of the car connected to said means and operative by pressure from the operator's foot for moving said valve means to the position for rendering the brake valve device at the other end of the car ineffective to control the brakes, and resilient means operative upon the relief of foot pressure on said member for moving said valve means to another position for effecting an application of the brakes.

10. In a fluid pressure brake, the combination with two brake valve devices operative independently to effect an application and a release of the brakes on a car, of valve means conditioned by manual effort for rendering one of said brake valve devices effective to control the brakes and for rendering the other of said brake valve devices ineffective to control the brakes, and means operative upon the relief of said manual effort for conditioning said valve means to render both of said brake valve devices ineffective and to effect an application of the brakes.

11. In a fluid pressure brake, the combination with a brake valve device operative to effect an application and a release of the brakes on a car, of valve means having one position for establishing the communications through which the brakes are applied and released by the operation of said brake valve device and movable to another position for closing said communications and for applying the brakes, means at one end of the car operative by manual effort to move said valve means to be the first mentioned position, resilient means for moving said valve means to the second mentioned position upon the relief of manual effort on said means, and switch means associated with said valve means and operative in the first mentioned position of said valve means to effect the closure of the car motive power circuit and operative in the second mentioned position to effect the opening of said circuit.

12. In a fluid pressure brake, the combination with a brake cylinder, a door engine movable by fluid under pressure at one time to a door closed position and at another time to a door open position, a pipe through which fluid under pressure is supplied to the door engine for moving the door engine to door closed position, another pipe through which fluid under pressure is supplied to the door engine to move the door engine to door open position, valve means having a position for establishing a communication through which fluid under pressure is vented from said brake cylinder and in which fluid under pressure is supplied to the first mentioned pipe, means connected to said valve means and operated by manual effort to hold said valve means in said position, and resilient means operative upon the relief of said manual effort to move said valve means to another position for supplying fluid under pressure to said brake cylinder and to the second mentioned pipe.

13. In a door control equipment for a car, the combination with a normal fluid pressure supply pipe, a door engine maintained in door closed position by fluid under pressure supplied from said pipe, an emergency supply pipe, a second door engine maintained in door closed position by fluid under pressure supplied from said normal supply pipe and movable to door open position by fluid under pressure supplied from said emergency supply pipe, upon release of fluid from said normal supply pipe, manually controlled means operable to establish communication from the emergency supply pipe to the second door engine, an emergency valve device having one position for supplying fluid under pressure to the normal supply pipe and an emergency position in which fluid is vented from the normal supply pipe and fluid under pressure is supplied to the emergency supply pipe, and means operative upon release of manual pressure for moving said emergency valve device to its emergency position.

14. In a door and brake control equipment for a car, the combination with a normal fluid pressure supply pipe, a door engine maintained in door closed position by fluid under pressure supplied from said pipe, an emergency supply pipe, a second door engine maintained in door closed position by fluid under pressure supplied from said normal supply pipe and movable to door open position by fluid under pressure supplied from said emergency supply pipe, upon release of fluid from said normal supply pipe, manually controlled means operable to establish communication from the emergency supply pipe to the second door engine, an emergency valve device having one position for supplying fluid under pressure to the normal supply pipe and an emergency position in which fluid is vented from the normal supply pipe and fluid under pressure is supplied to the emergency supply pipe and in which communication is established for effecting an application of the brakes, and means operative upon release of manual pressure for moving said emergency valve device to its emergency position.

15. In a door control equipment for a car, the combination with two door control engines, of a fluid under pressure supply pipe from which fluid under pressure is supplied to both door engines, a second fluid under pressure supply pipe from which fluid under pressure is supplied to one of said door engines, an emergency valve device having one position in which communication is established for supplying fluid under pressure to said first supply pipe and another position in which the supply fluid under pressure is cut off from the first supply pipe and fluid under pressure is supplied to the second supply pipe, and means operative upon release of manual pressure for moving said emergency valve device to its second mentioned position.

16. In a fluid pressure brake, the combination with a brake cylinder, of a brake valve device comprising a casing, a movable abutment contained in said casing and having at one side a chamber normally communicating with said brake cylinder and operated by variations in pressure applied to the opposite side for controlling the supply and release of fluid under pressure to and from said brake cylinder, said movable abutment having a chamber at the opposite side, said casing having a bore of smaller area than said abutment and opening into the last mentioned chamber, a movable abutment mounted in said bore, the space between said abutments being completely filled with liquid, a control spring acting on the last mentioned abutment, a manually operated member for varying the pressure of said spring on the last mentioned abutment, a normally vented pipe to which fluid under pressure is supplied for effecting the opening of a car door, valve means normally venting said pipe and operated by fluid under pressure to supply fluid under pressure to said pipe, a valve device subject to the pressure of fluid supplied to the brake cylinder by the operation of said brake valve device and operative when a predetermined pressure is obtained in said brake cylinder for supplying fluid under pressure for operating said valve means, and a one way communication, by-passing said valve device, through which fluid under pressure is released from said valve means as fluid under pressure is released from said brake cylinder.

17. In a fluid pressure brake, the combination with a brake valve device at each end of a car, said brake valve devices being operative independently of each other to control the brakes on the car, of valve means operative independently of the operation of said brake valve devices for rendering one or the other of said brake valve devices ineffective to control the brakes on the car, and means controlled by manual pressure for controlling the operation of said valve means.

18. In a fluid pressure brake, the combination with a brake valve device at each end of a car, said brake valve devices being operative independently of each other to control the brakes on the car, of valve means operative independently of the operation of said brake valve devices for controlling the operation of said brake valve devices, and manually controlled means at both ends of the car for controlling the operation of said valve means, said manually controlled means when subject to manual pressure at one end of the car being adapted to operate said valve means to render the brake valve device at the other end of the car ineffective to control the brakes.

19. In a fluid pressure brake, the combination with a brake valve device at each end of a car, said brake valve devices being operative independently of each other to control the brakes on the car, of valve means operative independently of the operation of said brake valve devices for rendering one or the other of said brake valve devices ineffective to control the brakes on the car, and means controlled by manual pressure for controlling the operation of said valve means, said valve means being automatically operative upon the relief of manual pressure on said means for applying the brakes independently of either of said brake valve devices.

20. In a fluid pressure brake, the combination with a brake valve device for effecting an application and a release of the brakes on a car, of valve means movable to a position for rendering said brake valve device ineffective to effect either an application or a release of the brakes on the car, and manually operated means operatively connected to said valve means and operative upon the relief of manual pressure for moving said valve means to said position.

21. In a fluid pressure brake, the combination with a brake valve device operative at one time to control the application and the release of brakes, of valve means having one position for establishing communications through which the application and the release of brakes is controlled by the operation of said brake valve device, and having another position for closing said communications thereby rendering said brake valve device ineffective to control the brakes, resilient means for urging said valve means to the last mentioned position, and means operative by manual pressure for moving said valve means to the first mentioned position against the opposing pressure of said resilient means.

22. In a fluid pressure brake, the combination with a brake valve device operative at one time to control the application and the release of brakes, of valve means having one position for establishing communications through which the application and the release of brakes is controlled by the operation of said brake valve device, and having another position for closing said communications thereby rendering said brake valve device ineffective to control the brakes and for at the same time establishing communications through which the brakes are applied independently of said brake valve device, resilient means for urging said valve means to the last mentioned position, and means operative by manual pressure for moving said valve means to the first mentioned position against the opposing pressure of said resilient means.

23. In a fluid pressure brake, the combination with a brake valve device at each end of a car, each of said brake valve devices being operative at different times and independently of the other to control the application and the release of brakes on the car, of valve means having one position for establishing communications through which the application and release of brakes is adapted to be controlled by one of said brake valve devices and for closing communications through which the application and release of brakes is adapted to be controlled by the other of said brake valve devices, said valve means being movable to another position for closing the first mentioned communications and at the same time for opening the second mentioned communications, and means at each end of the car associated with the brake valve device at the respective end of the car for controlling the positioning of said valve means, said means being operative by manual pressure to operate said valve means to establish the communications through which the brakes are adapted to be controlled by the associated brake valve device.

24. In a fluid pressure brake, the combination with a brake valve device at each end of a car, each of said brake valve devices being operative at different times independently of the other to control the application and the release of brakes on the car, valve means having one position for establishing communications through which an application of the brakes is effected independently of the operation of said brake valve devices, said valve means being movable from said position to another position for establishing communications through which the application and the release of brakes is adapted to be controlled by one of said brake valve devices and for closing communications through which the application and release of brakes is adapted to be controlled by the other brake valve device, said valve means being movable to a third position for changing said communications whereby the last mentioned brake valve device is rendered effective to control the application and release of brakes and the other brake valve device is rendered ineffective to control the application and the release of brakes, manually operated means at each end of the car operatively connected to said valve means and operative by sustained manual pressure at either one end or the other of the car, according to which end of the car is the control end, for rendering the brake valve device at the control end of the car effective to control the brakes and for rendering the other brake valve device ineffective to control the brakes, and resilient means opposing movement of said valve means by the operation of the manually operated means, said resilient means being operative upon the relief of pressure on said manually operated means for automatically moving said valve means to the position for effecting an application of the brakes independently of said brake valve devices.

25. In a car door and brake control equipment, the combination with a door engine operated by fluid under pressure to open the door of a car, of a brake valve device operative to control the supply of fluid under pressure for effecting an application of the brakes and for effecting the operation of said door engine to open the car door, and an emergency valve device having a normal position in which a communication is established through which the fluid under pressure for applying the brakes and opening the car door, by the operation of said brake valve device, is supplied to said brake valve device, said emergency valve device having an emergency position for closing said communication and for effecting an application of the brakes independently of said brake valve device.

26. In a car door and brake control equipment, the combination with a door engine operated by fluid under pressure to open the door of a car, of a brake valve device operative to control the supply of fluid under pressure for effecting an application of the brakes and for effecting the operation of said door engine to open the car door, means operative to delay said operation of said door engine until after a predetermined application of the brakes is effected by the operation of said brake valve device, and an emergency valve device having a normal position for rendering the brake valve device and means effective and an emergency position for rendering said brake valve device and means ineffective and for applying the brakes independently of said brake valve device.

JOSEPH C. McCUNE.